April 3, 1956  L. E. AUSTIN  2,740,438
HOPPER SCREW FEEDING MECHANISM
Original Filed Dec. 14, 1948  4 Sheets-Sheet 1
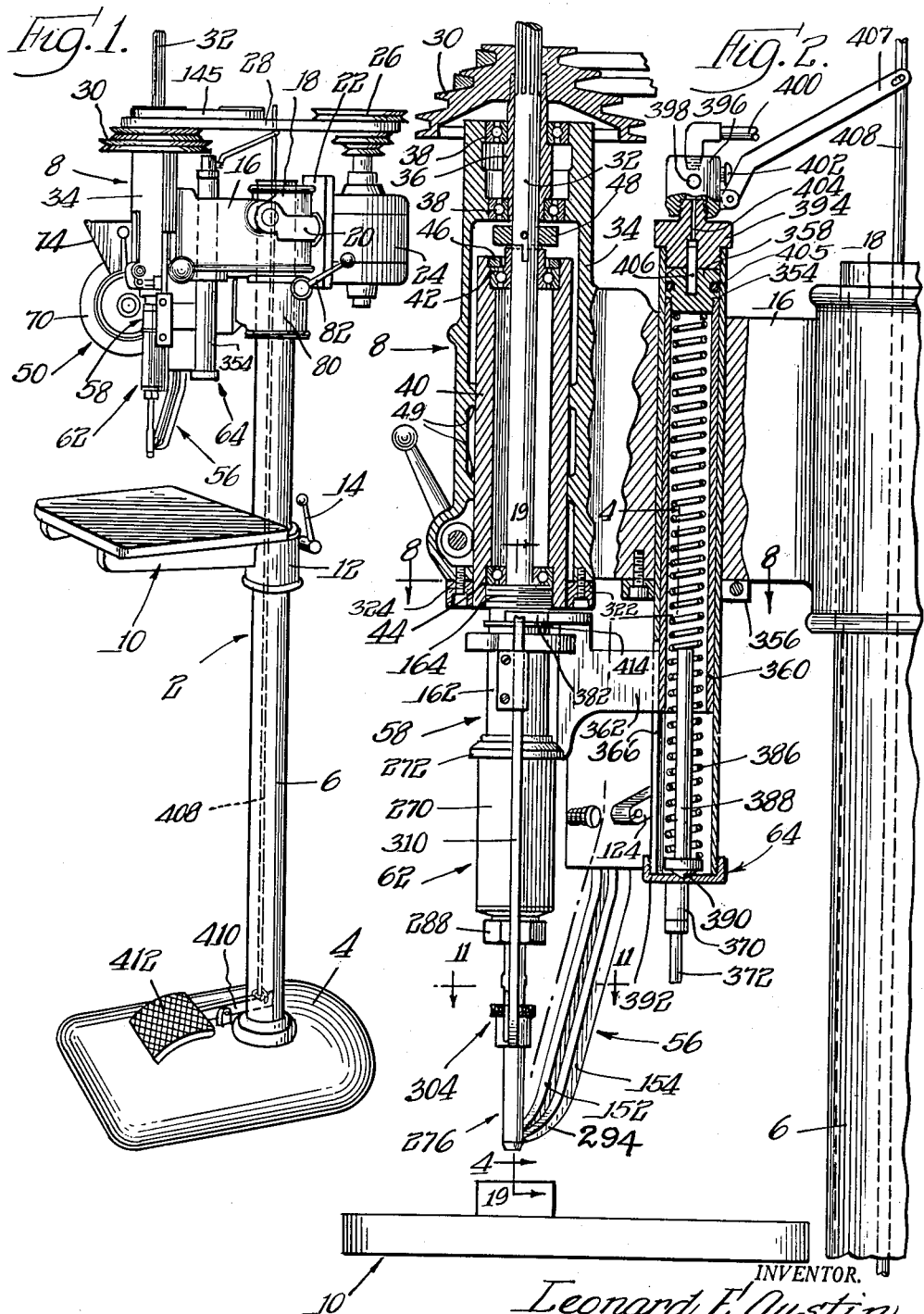
INVENTOR.
Leonard E. Austin
BY Olson & Trexler
attys.

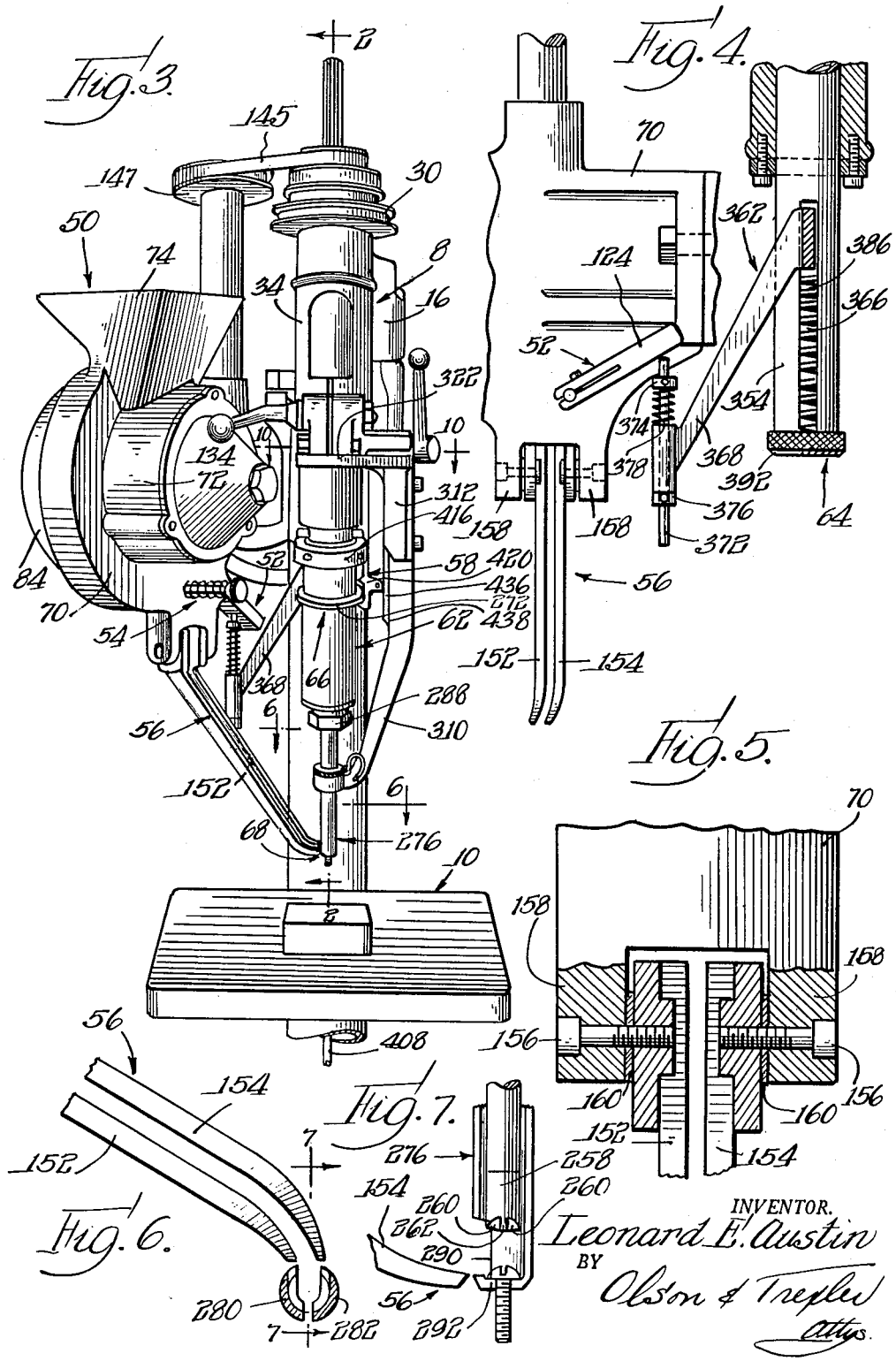

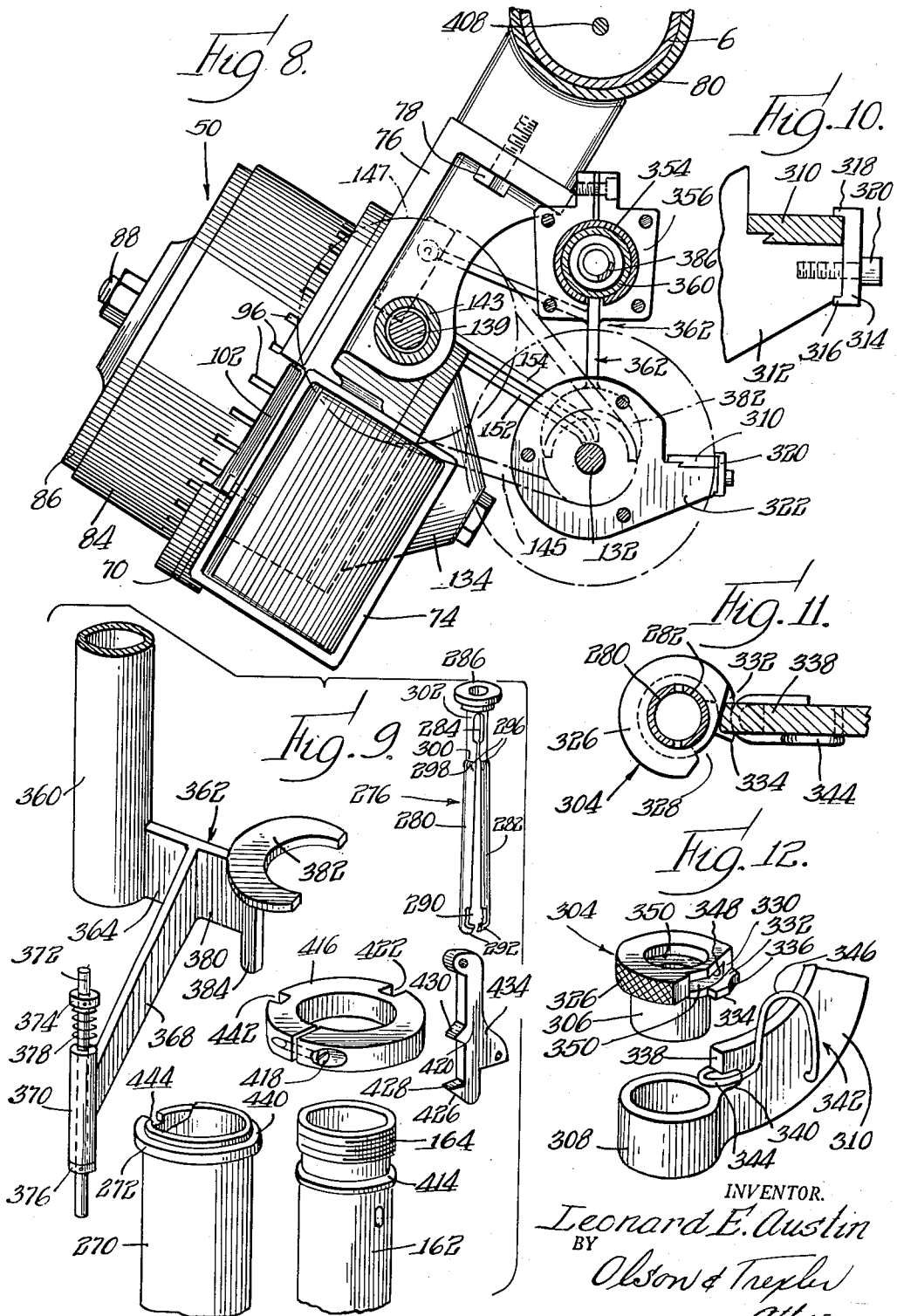

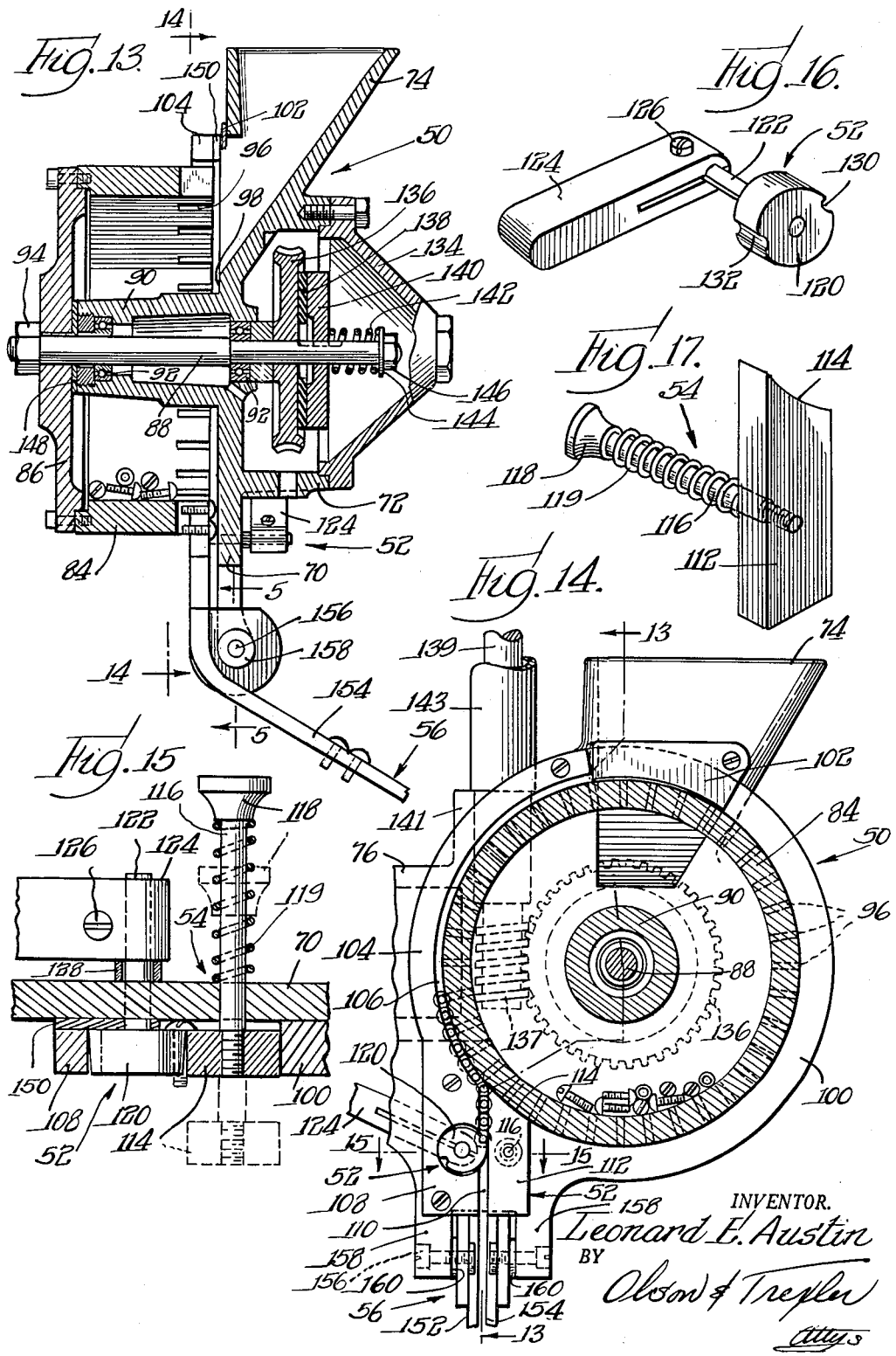

United States Patent Office 2,740,438
Patented Apr. 3, 1956

2,740,438
HOPPER SCREW FEEDING MECHANISM

Leonard E. Austin, South Bend, Ind., assignor to Illinois Tool Works, Chicago, Ill., a corporation of Illinois Original application December 14, 1948, Serial No. 65,277, now Patent No. 2,646,091, dated July 21, 1953. Divided and this application June 5, 1953, Serial No. 359,825

12 Claims. (Cl. 144—32)

This application is a division of my copending application Serial No. 65,277, filed December 14, 1948, for "Power Screw Driver," now Patent No. 2,646,091, issued July 21, 1953 and is concerned particularly with a hopper and screw feeding mechanism.

Hopper fed power screw drivers with which I am familiar have not been entirely satisfactory for a number of reasons including the failure of the hoppers and associated screw feeding mechanisms properly to deliver screws correctly oriented in alignment with the screw driver blade for driving thereby into a work piece.

Accordingly, it is an object of this invention to provide a power screw driver with a new or improved hopper and associated screw feeding mechanism.

Another object of this invention is to provide a hopper and screw feeding mechanism wherein a plurality of screws is automatically arranged in proper order and orientation and thereafter is released one at a time for feeding along a gravity chute.

A further object of this invention is to provide a hopper and screw feeding mechanism having novel means for clearing any jams that may develop.

Another object of this invention is to provide a hopper including a rotary selector drum through which screws are fed gravitationally with their axes arranged parallel to the axis of the drum and with their heads all oriented in a given direction.

Yet another object of this invention is to provide a hopper and screw feeding mechanism in which freedom from jamming is greater than heretofore thought possible.

Other and further objects and advantages of the invention will be apparent from the following description when taken in connection with the accompanying drawings wherein:

Fig. 1 is a view in perspective of a blower screw driver embodying the invention;

Fig. 2 is an enlarged, fragmentary view in substantially vertical section taken along the line 2—2 of Fig. 3;

Fig. 3 is a fragmentary view in perspective of the power screw driver of Fig. 1;

Fig. 4 is a fragmentary view in vertical section taken substantially along line 4—4 of Fig. 2;

Fig. 5 is a fragmentary enlarged view in vertical section taken substantially along the line 5—5 of Fig. 13;

Fig. 6 is a fragmentary enlarged view taken substantially along the line 6—6 of Fig. 3;

Fig. 7 is a fragmentary view in vertical section taken substantially along the line 7—7 of Fig. 6;

Fig. 8 is an enlarged view in horizontal section taken substantially along the line 8—8 of Fig. 2;

Fig. 9 is an exploded view in perspective of some of the elements of the mechanism.

Fig. 10 is an enlarged view in horizontal section taken substantially along the line 10—10 of Fig. 3;

Fig. 11 is a fragmentary view in horizontal section taken substantially along the line 11—11 of Fig. 2;

Fig. 12 is an exploded view in perspective of the parts shown in Fig. 11;

Fig. 13 is a fragmentary view of the hopper in vertical section taken substantially along the line 13—13 of Fig. 14;

Fig. 14 is a fragmentary view in vertical section taken substantially along the line 14—14 of Fig. 13;

Fig. 15 is a fragmentary view in horizontal section taken substantially along the line 15—15 of Fig. 14;

Fig. 16 is a view in perspective of a screw feed control escapement mechanism; and Fig. 17 is a view in perspective of a manually operable screw release mechanism.

As shown in the drawings, a power screw driver which forms one embodiment of the present invention, comprises a standard drill press 2 of the socket type to which is attached a plurality of additional and substitute or auxiliary mechanisms by which said drill press may be adapted for use as a hopper fed, power screw driver. The standard type of drill press 2 comprises a main base or stand 4, Fig. 1, on which is mounted a hollow supporting column or post 6 carrying at its upper end a vertically adjustable head unit 8 and intermediately of its length a vertically adjustable work table 10. The work table 10 is carried by the usual vertically slidable collar 12 clamped in adjustable position by the usual clamping means operated by hand lever 14. The head unit 8 includes the usual mounting frame 16 formed with a vertically slidable collar 18 clamped in adjusted position by the usual lever operating means, not shown.

The frame 16 is also formed on opposite sides of the collar 18 with bosses 20, one only of which is shown in the drawing, receiving adjustable mounting rods, not shown, for the motor mounting plate 22 to which is bolted on its rear face the usual drive motor 24, the shaft of which projects upwardly and carries at its upper end a four step pulley 26 driving a belt 28 which passes over a four step pulley 30 driving in the usual manner the multi-splined spindle 32.

The spindle 32 is journaled in the usual manner in the tubular front section 34 of the head frame 16, as by a sleeve 36 fitted in roller bearings 38 at the upper end of the tubular frame section 34. The spindle is also journaled in the vertically reciprocable quill or tube 40 (Fig. 2) as by roller bearings 42 and 44 at the upper and lower ends of the quill. The bearing 42 is held in place by the usual ring nut 46 and a collar 48 pinned to the spindle above the bearing 42 prevents relative axial movement between the spindle and the quill in a downward direction.

The quill or tube 40 is slidably mounted in the tubular frame section 34 in the usual manner as by axially spaced annular shoulders 49 formed on the inner surface of the tubular frame section 34.

The additional and substitute or auxiliary mechanism or means comprise screw feeding means including a screw feeding hopper 50, Figs. 1, 3, 8, 13 and 14; an escapement or screw feeding control device 52, Figs. 3, 4, 13, 14, 15 and 16, a manually operable screw releasing means or device 54, Figs. 4, 14, 15 and 17, and a screw feeding chute 56 Figs. 1 to 7, 13 and 14; a vertically reciprocable and rotatable screw driving means or unit 58, Figs. 1 to 3; vertically reciprocable screw receiving or carrying means 62, Figs. 1 to 3; manually or pedally operated or controlled actuating means 64, Figs. 1 and 2, causing vertical reciprocation of the screw driving means or unit; and automatically operable means 66, Fig. 3, for connecting the screw driving means or unit to, and for disconnecting it from, the vertically reciprocable screw receiving or carrying means to cause reciprocation of the screw receiving or carrying means during a portion of the reciprocation of the screw driving means or unit.

Screw feeding means

As previously described, this screw feeding means comprises a screw hopper 50, a control device or escapement 52, the screw releasing means 54, and the screw feeding chute 56.

The screw hopper comprises a main body casting 70

(Figs. 1, 8, and 13) having a drum portion 72 projecting from one side of the casting and a screw receiving funnel 74 having an inclined rear wall and opening through the front wall of the casting opposite the drum portion 72. The main body casting is also formed with a laterally extending bracket portion 76, Fig. 8, secured as by bolts 78 to the side arm of a collar 80 slidably mounted on the drill press column 6 and secured in adjusted position by any desired form of manually operable collar clamp 82, Fig. 1.

A tumbler drum 84 is mounted in juxtaposition to the outer face of the main hopper casting 70 in position to receive internally thereof screws from the lower open bottom of the hopper funnel 74. This drum 84 is bolted at its outer end to a drive disc 86 keyed to a drive shaft 88, best seen in Fig. 13. The main hopper casting 70 is formed with a projecting boss 90 supporting bearings 92 in which the shaft 88 is journaled, the shaft having an annular shoulder seating against the inner bearing 92 to prevent endwise movement of the shaft in one direction. The shaft projects through the drive disc 86 and is threaded at its outer end for reception of the clamping nut 94. The drum 84 is provided with a plurality of angularly spaced axially extending slots 96 of a cross dimension sufficiently greater than the diameter of the shanks of the screws to permit ready passage of the screws therethrough radially of the drum but sufficiently small in such cross dimension to prevent passage of the heads of the screws therethrough.

The drum at its inner end is spaced from the outer face or surface 98 of the main body casting 70 a distance comparable to the height of the heads of the screws so that screws which are lying with their heads proximate the surface 98 and their shanks extending axially of the drum will pass through the slots 96 with their heads passing radially between the inner edge of the drum and the surface 98 of the hopper casting 70.

A retaining ring or flange 100 secured to or formed integrally with the main body casting extends about the right side of the drum 84, as seen in Fig. 14, in close juxtaposition to the drum so that screws in the bottom part of the drum cannot pass therefrom.

An arcuate closure plate or strip 102 bolted to the main hopper casting extends over a portion of the drum at the top thereof to close the space between the bottom edge of the front wall of the hopper funnel 74 and the rotating drum 84 to prevent the screws dumped into the funnel from jumping out of the hopper over the rotating drum. A retaining ring 104 is bolted to the main hopper casting and extends about the left side of the drum, as seen in Fig. 14, in radially spaced relation thereto, so as to form an arcuate gravity feed chute 106 for receiving the screws which pass through the slots 96 of the drum. A block 108, Figs. 14 and 15, which may be integral with the ring 104, forms one side of a vertically extending gravity feed chute 110, the other side of which is formed by a block 112 forming part of the screw releasing means 54, Figs. 3 and 17.

The block 112 is formed at its upper end, as best seen in Figs. 14 and 17, with a part circular edge 114 which lies in close juxtaposition to the periphery of the drum 84 and projects slightly above the upper edge of the block 108 so as to engage the shank of a screw advancing down the curved chute 106 and direct it into the vertical chute 110. The block 112 is threaded on the outer end of a manually operable push pin or slide rod 116 slidably mounted in a suitable aperture in the main body casting 70. The push pin is provided with an enlarged head 118 and a coil spring 119 is interposed between one face of the main body casting and the head 118 so as to urge the block 112 to the closed position shown in full lines in Fig. 15. It will be evident that on depression of the push pin 116 to the dotted line position shown in Fig. 15 the block 112 will be moved to open position so that a screw jammed in the chute 106 or the chute 110 may be dropped or quickly removed therefrom.

The control device or escapement 52 preferably comprises a disc 120 (Figs. 15 and 16), fixed in any suitable manner to a pin 122 journaled in a suitable aperture in the main body casting 70, the disc 120 being received in a part circular opening or recess in the block 108. The operating lever or bar 124 is mounted on the outer end of the pin 122 and suitably secured thereto in a manner permitting angular adjustment of the bar relative to the pin. As shown in Figs. 15 and 16, this operating lever may be bifurcated to provide spaced arms receiving between them the pin 122 and the arms may be clamped to the pin by a clamping screw 126.

A spacing collar 128, Fig. 15, interposed between the bar 124 and the hopper casting prevents axial movement of the pin in one direction while the disc 120 prevents movement of the pin in the opposite direction. It should be noted that the disc 120 is formed with one pair of axially extending notches 130 and 132 to receive the shanks of one size of screw when the disc is positioned as shown in Fig. 15 and another size of screw when in a position at 180 degrees to that position. The notches 130 and 132 are of different sizes, and also different shapes when desirable, to handle different sizes of screws by simply loosening the clamping screw 126 and rotating the pin 122 relative to the lever bar 124 to an angle of 180 degrees.

It has been found that better control of the feeding of the screws down the vertical chute 110, with less likelihood of jamming, may be obtained by providing the disc 120 with an axially tapered periphery, so that the disc is slightly frusto-conical in shape with the end of greatest diameter adjacent the hopper casting, as seen in Fig. 15. The disc does not have a truly circular periphery in any plane transverse to its axis but the periphery is slightly eccentric to the axis of rotation of the disc, as illustrated in Fig. 14. It will be evident, as there shown, that the disc is of greatest radius at the forward edge of each screw receiving notch and of minimum radius at the opposite edge of the notch. It has been found that this difference in height of the opposite walls of the screw receiving notches 130 and 132 is of great benefit in eliminating jamming of the screws as they pass the escapement device.

The hopper drum driving shaft 88 extends from the boss 90 into the drum portion 72 of the hopper casting, which is closed by a cover 134 bolted to said drum portion of the casting. A worm gear 136 (Fig. 13) is loosely mounted on the shaft 88 and a friction clutch ring 138 is secured thereto. A driving disc 140 is splined to the shaft 88 for rotation therewith and for axial movement relative thereto. A coil spring 142 encircling shaft 88 is interposed between the driving disc 140 and a washer 144 secured to the shaft by a nut 146 threaded on the end of the shaft. It will be evident that coil spring 142 maintains the driving disc 140 in driving engagement with the friction clutch ring 138, which rotates with the worm gear 136, but said spring permits outward axial movement of the driving disc 140 to disconnect the shaft from the worm gear if the hopper drum becomes jammed. It should be noted that since the hopper drum extends outside or away from the main hopper casting it can readily be manually rotated reversely, on slippage of the clutch, to break the jam.

The worm gear 136 is driven by a worm 137 (Fig. 14) on the lower end of a vertical shaft 139 journaled in a boss 141 of the bracket 76 and housing in a mounting tube 143, the shaft 139 being driven by a belt 145 (Figs. 1 and 3) extending from the upper step of the pulley 30 to a pulley 147 on the upper end of the shaft 139 and journaled in tube 143.

Although the hopper drum 84 may be used for feeding screws within a rather wide range of sizes, from time to time adjustment may be necessary in order to enable it to handle screws outside that rather wide range. For that purpose one or more washer-like shims 148 (Fig. 13) may be inserted between the disc 86 and the outer end of the boss 90 of the main hopper casting and an arcuate shim 150 inserted between the retaining ring or sector 104 and the hopper casting 70 to accommodate screws of different shank lengths and head thicknesses.

The screws can only pass out of the slots of the drum in a limited arc lying below a horizontal plane through the axis of the drum and above the upper edge of the releasable side block 112 of the chute 110. There is, therefore, at any time only a relatively small number of screws in the limited arc and in the relatively short length of the vertical chute above the escapement device 52, as shown in Fig. 14.

Prior hopper arrangements with which applicant is familiar have used long screw delivery tracks filled with screws and that long line of screws remains substantially quiescent in the chute, proceeding down the chute at a very slow rate. The number of screws in the limited feeding arc of the chute 106 and in the section of the vertical chute 110 above the escapement device is small enough so that all of the screws resting therein are constantly agitated by the continuous rotation of the hopper drum and therefore jamming of the screws as they are fed is greatly lessened or eliminated.

From the vertical chute 110 the screws are fed individually, under the control of the escapement device 52, to the chute 56. This chute preferably comprises a pair of finger-like bars 152 and 154 secured as by bolts 156 to spaced lugs 158 depending from the main hopper casting 70. Washer-like shims 160 may be inserted between the mounting plate portions of the bars 152 and 154 and the inner faces of the lugs 158 to predetermine the spacing of the bars to permit passage of the shanks of the screws between the bars while the heads thereof ride upon the bars.

*The screw driving means and drive unit*

The vertically reciprocable and rotatable screw driving means or unit 58 comprises a tube or sleeve or mounting member 162 externally threaded at its upper end as at 164, Figs. 2 and 9, and threaded into the lower end of the quill 40 in place of the usual ring nut for holding the lower roller bearing 44 in position. The tube or sleeve 162 forms a housing for a drive unit shown and described in detail in my aforesaid copending application Serial No. 65,277, now Patent No. 2,646,091. Briefly, this drive unit includes a double clutch mechanism for driving a screw driver blade 258 (Fig. 7). The clutch mechanism is normally declutched, but is adapted to be brought into driving engagement to drive the blade as the quill or tube 40 is lowered as will be brought out hereinafter. The lower end of the screw driver blade is preferably shaped for complementary engagement with a screw head, and to this end may include a flat sided projection 262 for engaging in a screw slot. As further shown in Fig. 7, the lower end of the driver blade may be formed with concave recesses 260 to receive the head of a round headed screw.

*The screw carrying means*

The vertically reciprocable screw receiving or carrying means 62 preferably comprises a cylinder 270 (Fig. 2) having an annular flange 272 adjacent its upper end and a reduced externally threaded lower end, the sleeve 270 being slidably mounted on the sleeve or tube 162. A screw receiver and carrier or catcher 276, shown in Figs. 2, 3, 7 and 9, comprises a sleeve having resilient catcher arms 280 and 282 integrally united at the top of the sleeve, the arms being normally spaced by diametrically opposite slots extending from the bottom end of the sleeve to cross openings 284 in the wall of the sleeve adjacent the upper end thereof. At the upper end the sleeve is formed with an annular flange 286 received in a cup-like nut 288 (Figs. 2 and 3) threaded on a reduced lower end portion of the tube 270 in order detachably to mount the screw carrier or catcher on the tube. The catcher arms are formed at their lower ends with confronting slots 290 facing the bottom end of the chute 56 so as to permit the head of a screw moving down the chute to pass from the chute into the space between the catcher arms, the shank of the screw passing between the open catcher arms below the confronting slots 290. The catcher arms are formed at their lower ends with inturned generally semi-circular shelves or lips 292 forming a seat for the heads of the screws. The inner surface of the arms adjacent these shelves or lips 292 are semi-circular in form and preferably tapered axially for a short distance above the shelves or lips and exert a centralizing action on the screw when the catcher arms are brought to closed position, thereby aligning the shank of the screw with the axis of rotation of the driver blade. The external surfaces of the catcher arms are semi-circular in form and are preferably tapered or beveled at their lower ends as at 294 for a purpose presently to be described.

The catcher arms are formed with enlarged external cam portions or surfaces 296 which are joined to the surfaces of the arms above and below this cam portion by axially tapered cam surfaces 298 and 300, the sections 302 of the catcher arms above the cam portions 296 being of less external diameter than the cam portions 296 and the sections of the catcher arms below the cam portions, for purposes which will presently appear.

The opening and closing of the screw carrier or catcher 276 is governed by control means 304 (Figs. 2, 11, and 12) which preferably comprises a control sleeve or bushing 306 detachably mounted in a boss 308 formed at the lower end of a bar 310 (Figs. 2 and 3) and positioned in coaxial alignment with the drill press spindle 32 and concentric to the path of movement of the screw carrier. The bar 310 is slidably mounted for vertical adjustment on a depending arm or bar portion 312, see also Fig. 10, of a supporting bracket, the bar being dovetailed with the bracket arm 312 so that the precise vertical alignment of the boss 308 with the spindle is maintained in every position of vertical adjustment of the bar relative to the bracket. The bar is clamped to the bracket in adjusted position by a clamping plate 314 having along one side a flanged edge 316 received in a complementary groove or rabbet in the edge of the bracket arm 312 and an opposite flanged edge 318 overlying the edge of the adjustable bar 310 so that this clamping plate also forms a guide for the bar during its vertical adjustment.

The clamping plate is secured as by bolts 320 threaded into the bracket arm 312. This mounting bracket is also formed with a mounting ring or collar 322 (Figs. 2 and 3) extending perpendicular to the depending bracket arm 312. The mounting ring 322 of the bracket is secured to the lower edge of the tubular section 34 of the drill press head frame 16 as by mounting bolts 324. It is essential that mounting ring or collar 322 extend at right angles to the axis of the spindle 40 and therefore in some instances it may be necessary or desirable to grind the lower edge of the tubular section 34 of the drill press head frame 16 so as to square that edge with the spindle axis and thereby assure squareness of the mounting ring with the spindle axis.

The screw carrier guide and control sleeve 306 is formed with an enlarged and knurled head portion 326. A portion of the head 326 is cut away to provide an axially extending slot or recess 328 and a chordal groove or recess 330 communicating with the axial slot and forming a latching lug 332 having a cam nose 334 at its forward end and a concave latching recess 336 to the rear of the cam nose.

The mounting bar 310 is formed at its lower end with a mounting and retaining finger 338 for the control sleeve 306. The retaining finger 338 is spaced from the subjacent body of the bar 310 by a slot 340 of a width sufficient to receive the latching lug 332 of the control sleeve.

A resilient latch 342 comprises a piece of spring wire having a U-shaped latching end 344 extending on opposite sides of the bar 310 and passing through the slot 340 to engage the latching lug 332. The spring wire is also formed in a resilient loop 346 which is anchored to the bar 310 as by inserting the end of the wire into a suitable hole in the bar so that the resilient loop portion of the wire urges the U-shaped latching portion 344 into engagement with the latching lug 332 of the control sleeve. It will be evident that if, when the control sleeve is inserted in the boss 308, it is rotated to align the axial slot 328 with the retaining finger 338, the head 326 of the sleeve may be moved into the plane of the finger with the latching lug 332 lying in the plane of the slot 340 and the finger 338 lying in the plane of the chordal groove 330. Thereafter on turning of the sleeve in a clockwise direction, as seen in Figs. 11 and 12, the camming nose 334 of the latching lug 332 will engage the latching loop 344 of the latching spring and move it rearwardly until the camming nose has passed the latching loop and the latching loop then springs into the latching recess 336 for resiliently and detachably securing the control sleeve to the bar 310.

If a screw becomes jammed in the carrier or catcher, or for any reason becomes cocked with respect to the threaded opening in the work piece so it cannot be inserted by the screw driver blade, the operator may instantaneously release the screw simply by rotating the control sleeve 306 in a counterclockwise direction, as seen in Fig. 11, to release the latching lug from the retaining finger 338 of the latching spring 342 and align the axial slot 328 with the retaining finger and thereupon lift the control sleeve to allow the carrier or catcher arms to move to open position, as will presently appear.

The internal surface of the control sleeve is concentric with the spindle axis and is of a diameter such that when the annular beveled surface 298 of the cam portion 296 of the catcher arms engages the inner wall of the sleeve at the upper edge thereof, the catcher arms will be automatically moved to closed position due to the downward movement of the catcher arms through the sleeve. It will be evident that as the cam portion 296 passes below the lower end of the control sleeve, the annular tapered surface 300 passes the lower edge of the sleeve, the catcher arms will move to open position to such an extent as is permitted by the engagement of the reduced sections 302 of the catcher arms with the internal surface of the control sleeve.

The head 326 of the sleeve may be provided with an internal annular groove 348 opening into the chordal groove 330 and the axial slot 328 so as to permit insertion in the annular groove of a lubricant retaining and lubricating washer of ring 350. This ring serves by lubricating the external surface of the catcher and thereby the internal surface of the sleeve to reduce the friction between the catcher arms and the sleeve.

In order to reduce the friction, and in place of the lubricating ring 350, the control bushing may be provided with a bore of differing diameter, as set forth fully in my aforesaid copending application 65,277, now Patent No. 2,646,091. Thus, the lower portion of the bore of the control sleeve for an axial length of approximately one-eighth inch, may be made smaller than the remaining upper portion of the bore, so that it is only the lower portion of limited axial length which engages the surfaces of the catcher arms.

*The quill actuator and reciprocating drive connections*

The quill actuator 64 and reciprocating drive connections 66 comprise a fluid actuator or pneumatic motor including a cylinder 354, Figs. 1 and 2, received in a vertical hole drilled through the drill press frame 16 and mounted on the frame by a split mounting bracket 356, Fig. 2, clamped to the cylinder and bolted to the lower end of the frame 16.

A piston 358 is press fitted or otherwise secured in any convenient manner to a long tube 360 open at its bottom end, the upper end of the tube being closed by piston 358. The tube 360 at its lower end is secured to or formed integrally with a bracket 362, best seen in Fig. 9, the bracket having an arm 364 which extends from the cylinder 354 through a slot 366, Fig. 2, in the lower portion of the cylinder. The arm 364 is formed integrally with a diagonally depending arm 368, Figs. 3, 4 and 9, formed at its lower end with a boss 370 in which is slidably mounted an escapement control rod 372. The escapement control rod 372 is provided with a pair of adjustable collars 374 and 376 secured in adjusted position by appropriate set screws. A coil spring 378 is interposed between the upper end of the boss 370 and the collar 374.

It will be evident that the adjustable collar 376 determines the distance of projection of the control rod above the boss, while the adjustable collar 374 controls the extent of downward movement of the rod relative to the bracket 362. The bracket 362 is also formed with an arm 380 provided at its outer end with a semi-circular yoke 382 and depending guide bar or lug 384 which serves to guide the screw carrier sleeve 270, as will presently appear.

The fluid motor also includes a return actuating coil spring 386, Fig. 2, housed in the tube 360 and positioned at its lower end by a rod 388 which projects thereinto, the rod 388 having a tapered seating projection 390 seated in a tapered hole in a cap member 392 which is secured, in any convenient manner, to the lower end of the cylinder and closes the lower end thereof.

The upward movement of the piston 358 under the action of the return actuating spring 386 is determined by a cylinder head nut 394 threaded into the upper end of the cylinder and carrying a conventional air admitting and exhausting control valve structure 396, the valve structure having an air exhaust opening 398 and an air pressure supply pipe 400. The control valve actuating member 402 is normally urged to air exhausting position in which the air exhausting passage 398 is connected to the air passage 404 in the cylinder head nut 394. The piston 358 is provided with a cushion piston 406 in the form of a rod projecting above the main piston and received in a complementary small opening in the cylinder head nut 394, the small piston 406 serving to cushion the final upward movement of the main piston so that in its upper position it abuts the cylinder head, as shown in Fig. 2. Leakage of air past the piston 358 may be prevented by a single packing ring 405 set into a groove in the piston.

The control valve 396 may be operated to air admitting position connecting the air pressure supply pipe 400 to the air passage 404 by a lever 407 pivoted to the valve head 390 at one end and at its upper end to a control rod 408 extending through the hollow column 6 of the drill press. At its lower end the control rod 408 is connected to a lever 410 pivoted to the base 4 intermediate its ends, the lever passing into the column through an appropriate slot at the base of the column and carrying at its forward end a foot pedal or treadle 412 by means of which the lever may be swung in a counterclockwise direction, as seen in Fig. 1, to raise the control rod 408 and thereby swing the valve control leverd 407 in a counterclockwise direction and the control valve 402 to fluid admitting position. On release of the pedal 412 the weight of the control rod 408 causes return of the foot pedal to its upper position and moves the valve control lever 406 in a clockwise direction, thereby permitting the control valve 402 to move to air exhaust position connecting the air exhaust passage 398 to the air passage 404. The spring 386 thereupon moves the piston 358 and the tube 360 and consequently the bracket 362 to their upper positions.

The yoke 382 of the bracket 362 encircles the sleeve 162 of the screw driver unit 58, as seen in Fig. 2, the sleeve being provided adjacent its upper end in spaced relation to the threaded portion 164 with an annular, seating flange 414 for the yoke 382, the yoke being clamped between that flange and the bottom of the quill 40 when the sleeve 162 is threaded into the lower end of the quill. On return movement of the fluid motor, under the action of the spring 386, the escapement actuating rod 372 engages the operating bar or lever 124 (see Fig. 3) of the escapement control device 52 and swings the lever and the escapement control disc in a clockwise direction from the position shown in Fig. 14 so that the screw blank seated in the notch 130 or 132 of the escapement disc is released for movement down the lower part of the chute 110 and along the chute 56 to the screw carrier or catcher.

The tube or housing sleeve 162 of the screw driving unit, the quill and the spindle are directly connected to the fluid motor, as hereinbefore described, but the screw receiving or carrying means is operatively connected to the actuator only during a portion of the reciprocating movements of the screw driving unit, the quill and the spindle. The reciprocating and drive connections 66 by means of which the screw carrying means is thus caused to reciprocate with the screw driving unit only during a portion of its travel comprises a split clamping ring 416 (Figs. 3 and 9) clamped in adjusted position on the housing tube 162 of the screw driving unit as by clamping bolt 418. A clutch member or latch 420 is received in a slot 422 in the clamping ring 416, and is pivoted thereto as by a chordal pin 424, not shown, the member or latch depending from the clamping ring.

The latch 420 is formed at its lower end with a cam surface 426 forming also a latching projection providing a latching shoulder 428. Intermediate of its length on the same side as the latching projection, the member 420 is formed with a generally V-shaped camming projection 430 having upper and lower camming surfaces. The latch member is also formed on its opposite side with a control cam lug 434 adapted to ride upon a control track 436 formed integrally with the mounting bar 310 for the catcher control means 304. The control track 436 terminates at its lower end in a camming portion 438, which by engagement with the camming edge of the cam lug 434 causes inward movement of the latch member on upward movement of the screw driving unit and allows outward movement of the latch member during a downward movement of the screw driving unit.

It should be noted that the annular flange 272 formed on the upper end of the screw carrier tube 270 is tapered as at 440 (Fig. 9) to form a cam surface cooperating with the under camming surface of the cam projection 430 to cause the latch member to swing in a counterclockwise direction when the camming lug 434 on downward movement of the parts reaches the cut-out portion of the control track, provided by the camming surface 438.

It should further be noted that the under surface of the annular flange 272 is substantially normal to the surface of the screw carrier tube 270 so as to form a sharp shoulder providing a keeper for engagement by the sharp shoulder 428 of the latching projection of the latch member 420.

The clamping ring 416 is provided with a slot 422 and the annular flange 272 of the screw carrier tube 270 is provided with a similar slot 444 so as to receive the depending bar portion 384 of the fluid motor bracket 362. This bracket, which is guided in a precisely vertical plane by the slot 366 in the fluid motor cylinder (see Fig. 2) maintains the screw carrier tube 270 and the clamping ring 416 against rotation and maintains the latch member 420 in the plane of the control track 436.

*Operation*

A mass of screws is dumped into the hopper funnel 74 and passes therefrom through the open bottom of the funnel into the constantly rotating screw tumbler drum 84. Screws which in the course of being tumbled become aligned with their heads against the outer surface of the main hopper casting 70, Fig. 13, and with their shanks extending parallel to the axis of the drum and aligned with one of the slots 69 may pass therethrough during the time when the slot is moving in the arc extending from a horizontal plane through the axis of the drum to the upper edge of the block 112, see Fig. 14. The screws thus pass through the tumbler drum into the arcuate chute section 106 and then gravitate into the upper end of the vertical feed chute 110 where the shank of the foremost screw is received in a notch 130 or 132 of the escapement disc 120 and the line of screws in the chute above that escapement is thereby supported against further downward movement. The tumbler drum continues to agitate the screws, particularly those screws in the arcuate section 106 of the feed chute, and the agitation of these serves to transmit agitating forces to the screws in the section of the vertical chute 110 above the escapement disc.

When the control disc 120 is oscillated in a clockwise direction, as seen in Fig. 14, it releases the screw within the notch of the disc for gravitation down the remaining portion of the vertical chute 110 and down the bars 152 of the chute 56. The screw gravitating down the last chute passes directly between the parts of the partially closed catcher arms 280 and 282, as illustrated in Fig. 7. The screw driving unit and the catcher at this time are in the upward limit of movement, as shown in said figure, and the blade of the screw driver is spaced sufficiently above the lower end of the catcher arms to permit the head of the screw to pass freely through the slots 290 into the catcher arms and rest on the inwardly extending lips 292 of the catcher arms. At this time the latching shoulder 428 of the clutch member or latch 420 is in engagement with the under surface of the annular flange 272 of the carrier tube 270 and the clutch members 184 and 216 of the rotary and drive unit 60 are disengaged from each other. The operator presses the pedal 412 thereby raising the control rod 408 to swing the valve lever 407 in a counterclockwise direction, as seen in Fig. 2, thereby moving the fluid control valve 396 to fluid admitting position and the admission of pressure fluid to the fluid motor causes downward movement of the piston and thereby of the tube 360 and the bracket 362. This causes the quill 40 and the housing tube 162 of the screw driving unit to move downwardly. In view of the fact that the cam lug 430 of the clutch member or latch 420 is spaced from the shoulder 272 of the carrier tube 270 this downward movement of the screw driving unit is not transmitted to the screw carrier. This downward movement of the screw driving unit relative to the screw carrier continues until the blade of the screw driver has engaged the head of the screw and the bit 246 is thereby held against further downward movement. Continued downward movement of the screw driving unit causes the clutch parts to engage as fully explained in my aforesaid copending application Serial No. 65,277, now Patent No. 2,646,091, to rotate the driver blade and thereby to drive the screw.

As the screw driving unit and the screw carrier continue to move downwardly in unison, the cam portion 296 of the screw catcher arms reaches and passes into the control bushing or sleeve 306 which thereupon forces the screw catcher arms into closed position, thereby centralizing and holding the screw properly aligned for entrance into a threaded aperture of a work piece. If the screw head is oversized so that the catcher arms when closed grip the screw with such force as to prevent rotation thereof, the clutch may yield.

Normally, however, the screw driver continues to be rotated and to rotate the screw as it enters the work aperture and the screw driving unit and screw carrier continue to move down while the screw is threaded into the work until the cam portions 296 of the catcher arms pass the bottom of the control sleeve 306 and the reduced sections 302 of the catcher arms lie within the bushing. The catcher arms thereupon instantly spring to open position.

At the time that the cam portions 296 pass below the control bushing the latch member cam lug 434 reaches the camming portion 438 of the control track 436 and the lower cam surface of the cam lug 430 of the latch member interengaging with the tapered upper surface 440 of the annular shoulder 272 of the screw carrier tube 270 causes the latch member to move outwardly, releasing the screw carrier from the downwardly moving housing tube 162 of the screw driving unit. The screw carrier now rests upon the control bushing 306 but the screw driving unit continues to descend while the screw driver rotates and moves through the open screw catcher arms thereby driving the screw to its final position.

The operator thereupon releases the foot pedal 412, allowing the control valve 396 to return to its normal position, as previously described, thereby connecting the air passage 404 to the exhaust passage 398. The spring 386 of the fluid motor thereupon moves the piston in an upward direction and raises the drill press quill and spindle and the screw driving unit. The screw driving unit moves upwardly relative to the screw carrier until the cam lug 434 of the clutch member or latch 420 engaging the cam surface 438 at the lower end of the control track 436 swings the latch in a clockwise direction and causes the latching projection to engage the shoulder 272 of the screw carrier tube 270, after which the screw carrier or catcher moves upwardly with the screw driving unit. It will be evident of course that during this upward movement of the screw driving unit relative to the screw carrier, the screw driver bit 246 will be withdrawn into the catcher arms and thereafter as the screw driver unit and the screw carrier move upwardly to their original position the catcher arms will be returned to the position shown in Fig. 1 when they are in partially open position and aligned with the bottom end of the feed chute 56 to receive the next screw therefrom.

As the screw driving unit and screw carrier approach this upper position, the escapement control rod 372 engages the escapement control lever or bar 124 and again swings the escapement control disc in a clockwise direction, as seen in Fig. 14, to release the next screw for downward movement into the catcher arms of the screw carrier.

As previously indicated, various adjustments are provided for accommodating different types and sizes of screws. The stroke of the screw carrier or catcher may be adjusted to accommodate different size screws by sliding the bar 310 upwardly and downwardly relative to the depending arm 320 of the mounting ring 322. This adjustment of the control bar governs the extent to which the screw carrier may move downwardly bringing the reduced section 302 into the control bushing, of which time the catcher arms are opened and the screw carrier disconnected from the screw driving unit by the permitted outward swinging of the latch member 420. Adjustment of the timing of the operation of the escapement for different stroke adjustments of the screw carrier may readily be accomplished by adjustably positioning the collars 374 and 376 on the escapement control rod 372.

Adjustment of the hopper drum and the retaining sector 104 relative to the hopper casting 70 in order to accommodate screws of different head thicknesses may readily be accomplished as has previously been described, and similarly the chute bars 152 and 154 may be adjusted relative to each other to accommodate screws of different shank diameters. The slot 96 in the hopper drum may be of sufficient size to handle a wide range of screws of different shank diameter, and the retaining sector 104 with its chute block 108 and the chute block 112 may be readily replaced by similar parts of different transverse width to provide screw chutes 106 and 110 of different widths to accommodate screws of different sizes of shank diameter.

It should be noted that the cam lug 430 on the clutch member or latch 420 provides means for preventing the screw driver from being brought by downward relative movement of the screw driver unit into engagement with the screw receiving lips or shelves or ledges 292 of the screw catcher arms. If the screw driver were to engage these catcher arms 292 because of the failure of the screw feeding means to deliver a screw to the catcher, and the clutch member 216 was thereafter brought into engagement with the clutch member 184, the rotation of the screw driver might cause breakage either of the blade or the catcher arms. The latch member 420 is therefore mounted on the housing tube 162 of the screw driving unit, by adjustment of the mounting ring 416, along the tube so that the cam lug 430 will engage the upper beveled edge 440 of the annular flange 272 of the screw carrier tube 270 before the screw driver has been moved downwardly sufficiently to bring the blade into engagement with the screw receiving ledges 292 of the catcher arms. Therefore if by exhaustion of the screw supply or by reason of the failure of the screw feeding means, a screw is not delivered to the catcher, the cam lug will prevent the screw driver from engaging the catcher.

It should further be noted that as the screw approaches the work and the catcher arms are brought to closed position, as previously described, the screw is positively held in the catcher arms and will not be released therefrom on contact with the work if it is not properly aligned with the work aperture. In prior screw drivers with which applicant is familiar the screw carriers or clamps, simply being spring urged to hold the screw as it is brought to the work, frequently release the screw and the screw being driven by the screw driver, is released from the screw carrier and mars and defaces the work. However, in the present structure, the screw being positively held in the catcher will not be released therefrom and cannot mar the surface of the work if the screw becomes cross fitted with respect to the work aperture before the catcher has reached the open position. In such an event, the operator may rotate the control bushing 306 and lift it out of the boss 304 and raise it along the shanks of the catcher arms until it reaches the reduced section 302 of the catcher arms and the catcher arms are thereupon snapped to open position and disengage the screw from the catcher.

If the screw becomes jammed in the escapement mechanism, the spring 378 will permit the escapement control rod 372 to yield relative to the bracket 362 so that no damage will be done to the escapement mechanism or the fluid motor, and the operator may quickly release the jammed screw from the escapement simply by pushing the operating knob 118 of the pin 116, thereby moving the chute block 112 out of the plane of the escapement, thereby enabling the operator to disengage the jammed screw from the escapement.

It will be seen from the foregoing description that applicant has provided a power screw driver, and particularly a hopper fed power screw driver, which will avoid the difficulties and overcome the insufficiencies of prior power screw drivers. Screws are fed rapidly and efficiently from a random mass by the hopper and screw feeding mechanism herein disclosed and claimed. Screws cannot be fed out of the tumbler drum except in one particular orientation. The properly oriented screws are held in a chute which is sufficiently short as to tend to prevent jamming, and jamming is further precluded by agitation of the screws in this chute. Any jams that may form are readily cleared by simply pressing on the finger piece 118 to shift the block 112 from its normal position.

The escapement is particularly well adapted to release screws one at a time without jamming and is as simple in construction as it is trouble free in operation. The escapement readily can be adjusted to handle screws of different sizes, and movement of the escapement by a part reciprocating with the screw driver insures release of screws in proper timed relation with the movement of the screw driver. The axial taper of the escapement further promotes trouble free feeding of screws, as has been pointed out previously.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A screw feeding hopper comprising a stationary wall member, a shaft journalled in said member and projecting therefrom, a tumbler drum mounted on said shaft and spaced from said wall member according to the head thickness of the screws to be fed so that the heads of the screws may pass between the drum and the wall member, said drum having an open end facing said wall member, said wall member having an opening communicating with the open end of the drum for dumping the screws into the drum, said drum having a plurality of angularly spaced axially extending slots in the periphery thereof at its open end to permit screws having shanks aligned with the slots to pass radially out of the drum, means forming a retaining ring about the periphery of the drum, said ring having a portion in close juxtaposition to the periphery of the drum to prevent discharge of the screws therefrom and a portion in radially spaced relation to the drum to form with the drum an arcuate chute for delivering screws passing out of the drum, a gravity feed chute mounted to receive screws from said arcuate chute, and an escapement mechanism interposed between the gravity chute and the arcuate chute for releasing the screws one at a time from the arcuate chute into the gravity chute.

2. In a hopper as specified in claim 1, wherein the escapement mechanism comprises an oscillating disc having a notch to receive the shank of a screw from the arcuate chute and oscillatable to a position releasing a screw in the notch for passage into the gravity chute.

3. An escapement mechanism for controlling the passage of screws down a feed chute, said escapement mechanism comprising a frusto-conical disc having a notch extending parallel to the axis thereof and in the periphery of said disc, the wall of the notch in the direction of movement of the screw into the notch being of less height than the opposite wall of the notch.

4. An escapement mechanism as set forth in claim 3 wherein the disc has a pair of diametrically spaced notches parallel to the axis thereof, said notches being diametrically spaced from one another, and further including means for displaceably adjusting said disc 180° for feeding screws of different sizes.

5. An escapement mechanism for controlling the passage of screws down a feed chute comprising a disc having a notch extending parallel to the axis thereof and in the periphery of said disc, the wall of the notch in the direction of movement of the screw into the notch being of less height than the opposite wall of the notch.

6. A feed mechanism comprising a power driver, means for reciprocating said driver to drive a fastener, means for feeding fasteners into driving position in alignment with said driver, a hopper for supplying fasteners to said feeding means, escapement means for controlling the movement of fasteners from said hopper to said feeding means, and means extending from said escapement means and engageable with a part of said fastener reciprocating means to operate said escapement means to release a fastener once for each cycle of reciprocation of said driver.

7. A feed mechanism comprising a power driver, means for reciprocating said driver to drive a fastener, a spring pressed plunger reciprocable with and parallel to said driver, means for feeding fasteners into driving position in alignment with said driver, and escapement means for controlling the movement of fasteners by said feeding means, said escapement means including a part mounted in the path of reciprocation of said spring pressed plunger and engageable by said plunger during such movement parallel to said driver to operate said escapement means to release a fastener once for each cycle of reciprocation of said driver.

8. A feed mechanism as set forth in claim 7 wherein the part of the escapement means mounted in the path of reciprocation of the spring pressed plunger comprises a lever.

9. Apparatus for feeding headed fasteners comprising a drum mounted for rotation about a substantially horizontal axis, said drum being open at one end and having a plurality of angularly spaced axially extending slots in the periphery thereof at its open end for passing the shanks of fasteners aligned with said slots, baffle means spaced axially a predetermined distance from the periphery of the drum at the open end thereof for passing the heads of fasteners as their shanks pass through the slots, means for rotating said drum to agitate fasteners to align them with said slots, means for receiving said fasteners from said drum, an escapement mechanism holding fasteners in said receiving means and including an oscillatable disc having a notch to receive the shank of a screw for transferring screws from said receiving means, and means for periodically oscillating said disc to transfer a screw from said receiving means.

10. Apparatus as set forth in claim 9 wherein the drum rotating means includes a friction clutch adapted to slip to prevent damage in event of a jam.

11. A feed mechanism comprising a power driver, means for reciprocating said driver to drive a fastener, a spring pressed plunger slidably mounted in a part fixed for reciprocation with said driver, means for feeding fasteners into driving position in alignment with said driver, escapement means for controlling the movement of fasteners by said feeding means including a part mounted in the path of reciprocation of said spring pressed plunger and engageable by said plunger to operate said escapement means to release a fastener once for each cycle of reciprocation of said driver, and means for adjustably determining limits between which said plunger slides relative to said part.

12. Apparatus for feeding headed fasteners comprising a drum mounted for rotation about a substantially horizontal axes, said drum being open at one end and having a plurality of angularly spaced axially extending slots in the periphery thereof at the open end of the drum for passing the shanks of fasteners aligned with said slots, baffle means positioned adjacent the periphery of the drum at the open end thereof and forming with said slots passageways for the heads of fasteners as the fastener shanks pass through the slots, means providing a retaining ring about said drum in part being in close proximity to said drum and in part spaced from said drum to provide an arcuate passageway receiving fasteners passing through said slots, means providing a guideway receiving fasteners from said arcuate passageways, and an escapement mechanism controlling the movement of fasteners from said passageway into said guideway, said guideway including a spring pressed part adjacent said escapement mechanism and manually retractable for clearing jams.

References Cited in the file of this patent

UNITED STATES PATENTS

| 1,858,276 | Miller | May 17, 1932 |
| 2,261,134 | Blair | Nov. 4, 1941 |
| 2,263,858 | Borge | Nov. 25, 1941 |
| 2,433,096 | Davis | Dec. 23, 1947 |
| 2,605,792 | Havener | Aug. 5, 1952 |
| 2,646,091 | Austin | July 21, 1953 |
| 2,664,121 | Travis | Dec. 29, 1953 |

FOREIGN PATENTS

| 722,799 | Germany | July 21, 1942 |